(12) United States Patent  (10) Patent No.: US 7,478,167 B2
Ould-Brahim et al.  (45) Date of Patent: Jan. 13, 2009

(54) RESOURCE ALLOCATION USING AN AUTO-DISCOVERY MECHANISM FOR PROVIDER-PROVISIONED LAYER-2 AND LAYER-3 VIRTUAL PRIVATE NETWORKS

(75) Inventors: Hamid Ould-Brahim, Kanata (CA); Donald Fedyk, Groton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1004 days.

(21) Appl. No.: 10/389,997

(22) Filed: Mar. 18, 2003

(65) Prior Publication Data

US 2003/0177221 A1 Sep. 18, 2003

Related U.S. Application Data

(60) Provisional application No. 60/365,878, filed on Mar. 18, 2002.

(51) Int. Cl.
*G06F 15/173* (2006.01)
(52) U.S. Cl. .................................. 709/238; 370/256
(58) Field of Classification Search ................. 709/225, 709/227, 249, 224, 228, 236, 246, 223; 370/328, 370/338, 400, 331, 392, 349, 353, 256, 254, 370/229, 238
See application file for complete search history.

(56) References Cited

U.S. PATENT DOCUMENTS

| | | | |
|---|---|---|---|
| 6,079,020 A | | 6/2000 | Liu |
| 6,085,238 A | | 7/2000 | Yuasa et al. |
| 6,327,252 B1 * | 12/2001 | Silton et al. .................. 370/256 |
| 6,377,982 B1 * | 4/2002 | Rai et al. ..................... 709/217 |
| 6,415,323 B1 * | 7/2002 | McCanne et al. ........... 709/225 |
| 6,421,733 B1 * | 7/2002 | Tso et al. ..................... 709/246 |
| 6,470,386 B1 * | 10/2002 | Combar et al. .............. 709/224 |
| 6,473,863 B1 | 10/2002 | Genty et al. |
| 6,714,987 B1 * | 3/2004 | Amin et al. .................. 709/249 |
| 6,738,909 B1 * | 5/2004 | Cheng et al. .................... 726/3 |

(Continued)

OTHER PUBLICATIONS

Tunneling multicast traffic through non-multicast-aware networks and encryption devices Higgins, L.; McDowell, G.; VonTobel, B.; Military Communications Conference, 2001. MILCOM 2001. Communications for Network-Centric Operations: Creating the Information Force. IEEE; vol. 1, Oct. 28-31, 2001 pp. 296-300 vol. 1.*

(Continued)

*Primary Examiner*—Thong H Vu
(74) *Attorney, Agent, or Firm*—Hunton & Williams, LLP

(57) ABSTRACT

A technique for resource distribution using an auto-discovery mechanism for Provider-Provisioned Layer-2 and Layer-3 Virtual Private Networks. In one particular exemplary embodiment, the technique may be realized by a method for establishing a Virtual Private Network (VPN) tunnel between a first provider edge (PE) device and a second (PE) device of a provider-provisioned VPN. The method may comprise advertising at least one tunnel-based parameter to one or more PE devices over a network backbone using an auto-discovery mechanism, the one or more PE devices including at least one of the first and second PE devices. The method further may comprise configuring a VPN tunnel between the first and second PE devices based at least in part on the at least one tunnel-based parameter.

18 Claims, 5 Drawing Sheets

U.S. PATENT DOCUMENTS

| | | | | |
|---|---|---|---|---|
| 6,765,881 | B1* | 7/2004 | Rajakarunanayake | 370/256 |
| 6,826,616 | B2* | 11/2004 | Larson et al. | 709/228 |
| 6,829,221 | B1* | 12/2004 | Winckles et al. | 370/238 |
| 6,941,366 | B2* | 9/2005 | Antes et al. | 709/224 |
| 6,954,790 | B2* | 10/2005 | Forslow | 709/227 |
| 6,973,057 | B1* | 12/2005 | Forslow | 370/328 |
| 7,003,481 | B2* | 2/2006 | Banka et al. | 705/26 |
| 7,010,591 | B1* | 3/2006 | Acharya | 709/224 |
| 7,013,342 | B2* | 3/2006 | Riddle | 709/230 |
| 7,031,266 | B1* | 4/2006 | Patel et al. | 370/254 |
| 7,039,034 | B2* | 5/2006 | Dick et al. | 370/338 |
| 7,061,911 | B2* | 6/2006 | Furuno | 370/392 |
| 7,065,579 | B2* | 6/2006 | Traversat et al. | 709/230 |
| 7,068,624 | B1* | 6/2006 | Dantu et al. | 370/331 |
| 7,068,640 | B2* | 6/2006 | Kakemizu et al. | 370/349 |
| 7,082,102 | B1* | 7/2006 | Wright | 370/229 |
| 7,092,943 | B2* | 8/2006 | Roese et al. | 707/9 |
| 7,240,106 | B2* | 7/2007 | Cochran et al. | 709/222 |
| 7,263,557 | B2* | 8/2007 | Lund et al. | 709/228 |
| 7,272,643 | B1* | 9/2007 | Sarkar et al. | 709/222 |
| 7,283,519 | B2* | 10/2007 | Girard | 370/353 |
| 7,284,054 | B2* | 10/2007 | Radhakrishnan | 709/226 |
| 2001/0040895 | A1* | 11/2001 | Templin | 370/466 |
| 2002/0103878 | A1* | 8/2002 | Moncibais | 709/217 |
| 2003/0018805 | A1* | 1/2003 | Meyerson | 709/237 |
| 2003/0018820 | A1* | 1/2003 | Ould-Brahim et al. | 709/249 |
| 2003/0018889 | A1* | 1/2003 | Burnett et al. | 713/153 |
| 2003/0037163 | A1* | 2/2003 | Kitada et al. | 709/236 |
| 2003/0061315 | A1* | 3/2003 | Jin | 709/220 |
| 2003/0112808 | A1* | 6/2003 | Solomon | 370/400 |
| 2003/0140131 | A1* | 7/2003 | Chandrashekhar et al. | 709/223 |
| 2003/0140223 | A1* | 7/2003 | Desideri | 713/153 |
| 2004/0261116 | A1* | 12/2004 | Mckeown et al. | 725/109 |
| 2005/0213545 | A1* | 9/2005 | Choyi et al. | 370/338 |

OTHER PUBLICATIONS

A Two-Tier Resource Management Model for. . . —Reichmeyer, Ong. . . (1998) irl.cs.ucla.edu/papers/2-tier-draf.ps.*
Design Guidelines for Robust Internet Protocols—Anderson, Shenker, Stoica. . . (2002) www.cs.washington.edu/hotnets/papers/anderson.pdf.*
Internet Draft-AFramework for Layer 3 PPVPNs, Feb. 2002.*
Waldemar Augustyn et al., "Requirements for Virtual Private LAN Services (VPLS)," Oct. 2002, accessed at <httd://www.ietf.org/internet-drafts/draft-ietf-ppvpn-vpls-requirements-01.txt>.
Eric Rosen et al., "L2VPN Framework," Feb. 2003, accessed at <http://www.ietf.org/internet-drafts/draft-ietf-ppvpn-12-framework-03.txt>.
Hamid Ould-Brahim et al., "Network based IP VPN Architecture using Virtual Routers," Jul. 2002, accessed at <http://www.ietf.org/internet-drafts-ietf-ppvpn-vpn-vr-03.txt>.
Eric Rosen et al., "BGP/MPLS VPNs," Oct. 2002, accessed at <http://www.ietf.org/internet-drafts/draft-ietf-ppvpn-rfc2547bis-03.txt>.
Hamid Ould-Brahim et al., "Using BGP as an Auto-Discovery Mechanism for Network-Based VPNs," Aug. 2002, accessed at <http://www.ietf.org/internet-drafts/draft-ietf-ppvpn-bgvpn-auto-03.txt>.
International Search Report dated Jun. 3, 2003 for PCT/CA03/00363.

* cited by examiner

VPN Capability Discovery for Layer-3 VPNs using Virtual Routing

VPN Capability Discovery for Layer-2 VPNs using VPLS or VPW

RESOURCE ALLOCATION USING AN AUTO-DISCOVERY MECHANISM FOR PROVIDER-PROVISIONED LAYER-2 AND LAYER-3 VIRTUAL PRIVATE NETWORKS

CROSS-REFERENCE TO RELATED APPLICATIONS

This patent application claims priority to U.S. Provisional Patent Application No. 60/365,878, filed Mar. 18, 2002, which is hereby incorporated by reference herein in its entirety.

FIELD OF THE INVENTION

The present invention relates generally to Virtual Private Networks (VPNs) and, more particularly, to a technique for implementing resource allocation for implementing VPN services using an auto-discovery process for configuring one or more Layer-2 and Layer-3 VPNs.

BACKGROUND OF THE INVENTION

In the absence of a privacy mechanism, sensitive data (e.g., passwords, account numbers, proprietary information, etc.) transmitted over a network may be susceptible to interception by unauthorized parties. One privacy mechanism commonly used to protect network data is the Virtual Private Network (VPN). Using specialized tunneling protocols and optionally secure encryption techniques, data integrity and privacy may be maintained in a VPN in what seems like a dedicated point-to-point connection.

Network-based VPNs typically are implemented through a tunneling mechanism. In general, the tunneling mechanism encapsulates the packet headers and/or payload prior to transmission of the packet over an established VPN tunnel. As a result, the transmission of a VPN-based packet only uses non-tunneling information, such as the Internet Protocol (IP) addresses of the ends of the tunnels, while the sensitive information, such as the source and destination IP addresses and sensitive payload data, remains encapsulated. Exemplary tunneling mechanisms include IP/IP tunneling, Generic Router Encapsulation (GRE) tunneling, IP Security (IPSec) tunneling and Multi-Protocol Label Switching (MPLS) tunneling. The configuration of VPN tunnel typically is specific to the particular type of VPN used.

A typical Network IP-based VPN generally includes at least two provider edge (PE) devices (e.g., a VPN-enabled router) interconnected via a series of provider devices (e.g., routers) that form a network backbone, where the network backbone typically includes one or more public networks, such as, for example, the Internet or a wide area network (WAN). Connected to each PE device are one or more customer edge (CE) devices, such as a workstation or personal computer. In this type of network-based VPN, VPN tunnels are established between PE devices, rather than between CE devices. These tunnels, herein referred to as PE-PE tunnels, typically are established at either Layer-2 or Layer-3 of the International Standard Organization's Open System Interconnect (ISO/OSI) network model. Exemplary VPN mechanisms at Layer-2 include Virtual Private LAN Service (VPLS) (see Waldemar Augustyn et al., "Requirements for Virtual Private LAN Services (VPLS)," October 2002, available at <http://www.ietf.org/internet-drafts/draft-ietf-ppvpn-vpls-requirements-01.txt>, the entirety of which is hereby incorporated herein by reference) and Virtual Private Wire (VPW) (see Eric Rosen et al., "L2VPN Framework," February 2003, available at <http://www.ietf.org/internet-drafts/draft-ietf-ppvpn-12-framework-03.txt>, the entirety of which is hereby incorporated herein by reference). Exemplary VPN mechanisms at Layer-3 include Virtual Routing (VR)-based mechanisms, such as VR using Border Gateway Protocol (BGP) (see Hamid Ould-Brahim et al. "Network based IP VPN Architecture using Virtual Routers," July 2002, available at <http://www.ietf.org/internet-drafts/draft-ietf-ppvpn-vpn-vr-03.txt>, the entirety of which is hereby incorporated herein by reference) or VPNs based on RFC 2547bis (often referred to as BGP/MLPS-based VPNs)(see Eric Rosen et al., "BGP/MPLS VPNs" available at <http://www.ietf.org/internet-drafts/draft-ietf-ppvpn-rfc2547bis-03.txt>, October 2002, the entirety of which is hereby incorporated herein by reference).

Regardless of the VPN mechanism used, a primary step in establishing a network-based VPN is to provide information about each VPN configured on a local PE device to the remaining remote PE devices. A number of mechanisms may be implemented to achieve this distribution of PE information, such as BGP, Domain Name Service (DNS), Remote Authentication Dial In User Service (RADIUS), and the like. Such mechanisms are well known in the art. After distributing this PE information, one or more PE-PE tunnels typically are established based in part on information received through a VPN auto-discovery mechanism.

Various tunnel signalling protocols may be used to establish and maintain VPN tunnels, such as, for example, Resource Reservation Protocol (RSVP), Resource Reservation Protocol—Traffic Engineered (RSVP-TE), Label Distribution Protocol (LDP), Constraint-based Routing LDP (CR-LDP), Asynchronous Transfer Mode (ATM), Frame Relay, Generic Routing Encapsulation (GRE), IPSec, and the like.

Various parameters for VPN tunnels in conventional Layer-2 and Layer-3 VPNs typically are configured manually by the service provider. As a result, the scalability of such conventional VPN implementations is limited due to the difficulty in manually configuring a complex and dynamic VPN system having a large number of PE devices and/or constantly changing system requirements, such as a continuous changing number of tunnels/VPNs, constant, continuous changes in resources such as bandwidth, delay and/or Quality of Service (QoS) requirements, and the like. Further, these conventional VPN implementations generally lack a defined mechanism to relate VPN tunnels to a per VPN or per set of VPNs resources such as QoS profiles or other tunnel-specific parameters. As a result, the flexibility of such conventional VPN systems is compromised because the VPN is unable to predictably respond to changes in bandwidth requirements, QoS requirements, and the like.

In view of the foregoing, it would be desirable to provide a technique for facilitating the configuration of VPN tunnels based at least in part on supplied parameters in an auto-discovery manner. More particularly, it would be desirable to implement resource profiles such as Quality of Service (QoS) parameters using a VPN auto-discovery as an extension to existing auto-discovery mechanisms in an efficient and cost effective manner.

SUMMARY OF THE INVENTION

In accordance with one embodiment of the present invention, a method for establishing a Virtual Private Network (VPN) tunnel between a first provider edge (PE) device and a second (PE) device of a Provider-Provisioned VPN (PPVPN) is provided. The method comprises advertising at least one tunnel-based parameter to one or more PE devices over a network backbone using an auto-discovery mechanism, the one or more PE devices including at least one of the first and second PE devices and configuring a VPN tunnel between the first and second PE devices based at least in part on the at least one tunnel-based parameter. A computer signal embodied in a carrier wave readable by a computing system and encoding a computer program of instructions for executing a computer process may be used to perform the above method.

In a Provider-Provisioned Virtual Private Network (PPVPN), a system is provided in accordance with another embodiment of the present invention. The system comprises auto-discovery means for distributing at least one Virtual Private Network (VPN) tunnel-based parameter to at least a first and second provider edge (PE) devices and tunnel signalling means for configuring a VPN tunnel over a network backbone between the first and second PE devices based at least in part on the at least one tunnel-based parameter.

In a distributed network, a Provider-Provisioned Virtual Private Network (PPVPN) system is provided in accordance with yet another embodiment of the present invention. The system comprises a network backbone, a first and second provider edge (PE)device, each operably connected to the network backbone and an auto-discovery mechanism for distributing at least one VPN tunnel parameter to at least the first and second PE devices as an extension to an auto-discovery protocol.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

FIGS. 1-5 illustrate various exemplary implementations for creating scalable VPN PE-PE tunnels in Level-2 or Level-2 PPVPNs using an auto-discovery mechanism. Information regarding the establishment and/or configuration of a tunnel between two PE devices may be advertised among the PE devices of a network. This information may include, for example, the desired tunnel signalling protocol, the Quality of Service (QoS) profile for the tunnel, the PE tunnel endpoint, membership information, the VPN technology to be used, etc. In at least one embodiment, this information may be advertised as an extension to a conventional auto-discovery mechanism commonly used in VPNs, such as the Border Gateway Protocol (BGP), directory service protocols (e.g., Domain Name Service (DNS), RADIUS), and the like. After distributing this information, a tunnel may be established between the appropriate PE devices based at least in part on the supplied information. Alternatively, the PEs may select an existing tunnel that complies with some or all of the supplied parameters. By implementing an auto-discovery technique to distribute the QoS profile for the purpose of VPN tunnel configuration and/or establishment information, the scalability of the VPN system may be enhanced because the QoS profile of a tunnel may be set according to the requirements of the VPN services, where the information is distributed among the PEs in an automated fashion rather than implemented by manual configuration as conventional VPN systems.

Figure 1:
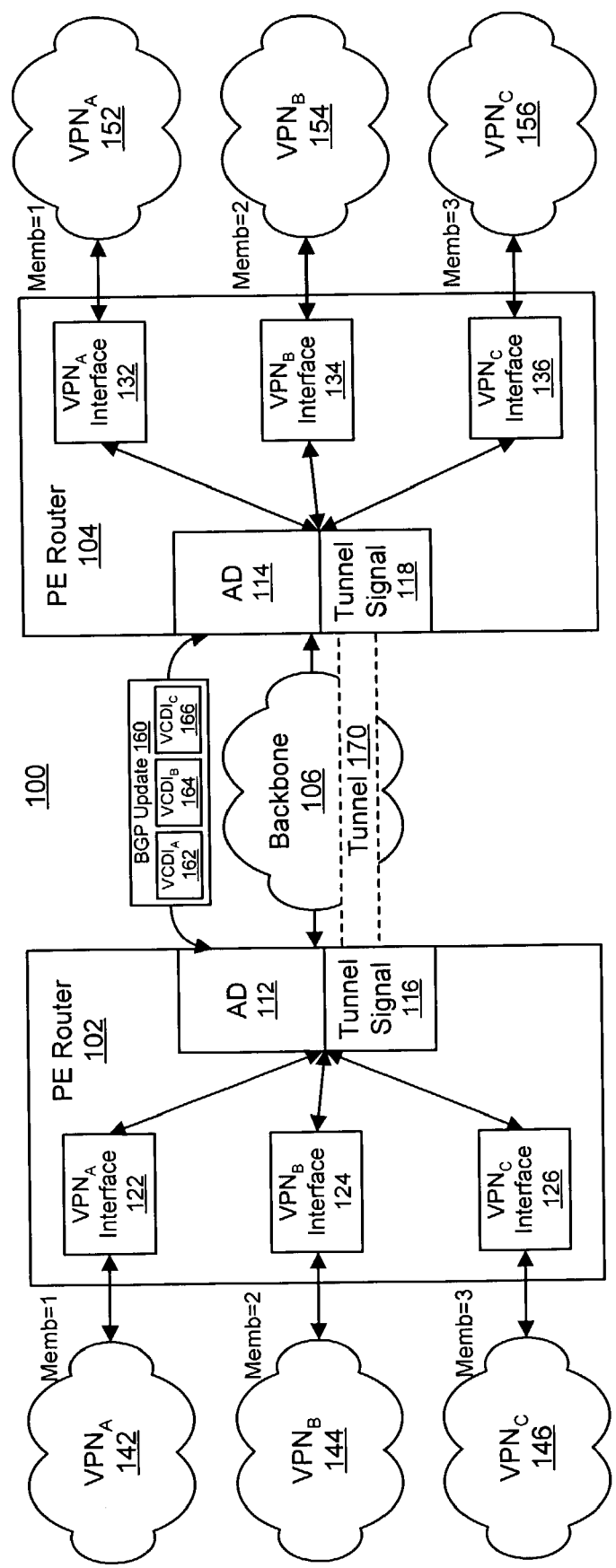
FIG. 1 is a schematic diagram illustrating a Provider-Provisioned Virtual Private Network (PPVPN) system utilizing a VPN auto-discovery mechanism in accordance with at least one embodiment of the present invention.

Referring now to FIG. 1, an exemplary PPVPN system 100 implementing a capability discovery mechanism is illustrated in accordance with at least one embodiment of the present invention. In the illustrated example, the PPVPN system 100 includes PE routers 102, 104 connected via a network backbone 106. Although described herein as VPN-enabled routers, the PE routers 102, 104 may include other appropriate PE devices such as, for example, MPLS/IP Layer-2 switches. The network backbone 106 may include any number of provider network devices interconnected using one or more data link types such as, for example, IP, ATM, Frame Relay (FR), Time Division Multiplexing (TDM), Ethernet, Optical Ethernet, and the like.

Connected to each PE router 102, 104 is one or more VPN segments, such as VPN segments 142-146 connected to PE router 102 and VPN segments 152-156 connected to PE router 104. Each VPN segment 142-146, 152-156 may include one or more networked customer edge (CE) devices as well as devices to facilitate network connectivity, such as hubs, routers, switches, bridges, and the like. As understood in the art, CE devices may include any of a variety of networked devices, such as personal computers, laptops, workstations, and the like.

In general, each VPN segment connected to the PE router 102 is a member of the same VPN as a VPN segment connected to the PE Router 104, thereby allowing a VPN to be established between devices on the VPN segments. In the illustrated example, the VPN segments 142, 152 are members of $VPN_A$, the VPN segments 144, 154 are members of $VPN_B$, and the VPN segments 146, 156 are members of $VPN_C$. Although each VPN segment is illustrated in FIG. 1 as a member of a single VPN, it will be appreciated that a VPN segment may be a member of a plurality of VPNs. Likewise, a CE device may be a member of a plurality of VPNs and therefore may be a member of more than one VPN segment.

To facilitate communications between VPN segments, each PE router 102, 104 may include a VPN interface corresponding to a VPN segment. To illustrate, the PE router 102 may include VPN interfaces 122-126 to interface with VPN segments 142-146, respectively, and the PE router 104 may include VPN interfaces 132-136 to interface with VPN segments 152-156, respectively.

Depending on the VPN technology utilized, the VPN interfaces 122-126, 132-136 may be implemented in any of a variety of ways. For example, if the PPVPN system 100 implements a Layer-3 VPN using Virtual Routing (VR), the VPN interfaces 122-126, 132-136 may include Virtual Routers implemented by the PE routers 102, 104 to provide Virtual Routing between the CE devices on the VPN segments. Virtual Routing and Virtual Routers are well known to those skilled in the art.

For example, if the PPVPN system 100 implements a Layer-3 VPN using RFC2547bis, the VPN interfaces 122-126, 132-136 may include Virtual Routing and Forwarding (VRF) implemented by the PE routers 102, 104 to provide Virtual Routing and Forwarding tables between the CE devices on the VPN segments. RFC2547bis and Virtual Routing and Forwarding are well known to those skilled in the art.

Alternatively, if the PPVPN system 100 implements a Layer-2 VPW in accordance with VPW (see, e.g., "L2VPN Framework," supra), the VPN interfaces 122-126, 132-136 may include a Virtual Switching Instance (VSI) implemented by the PE routers 102, 104 to provide Layer-2 attachment circuits between the CE devices on the VPN segments. Layer-2 VPNs and Virtual Switching Instances are well known to those skilled in the art.

Further, in at least one embodiment, the PE router 102 may include an auto-discovery (AD) component 112 and a tunnel signalling component 116 and the PE route 104 may include an AD component 114 and a tunnel signalling component 118. As discussed in greater detail below, the tunnel signalling components 116, 118 may be adapted to create, configure and/or maintain one or more VPN tunnels 170 between the PE routers 102-104 using one or more tunnel signalling mechanisms. Exemplary tunnel signalling mechanisms implemented by the tunnel signalling components 116, 118 may include, for example, RSVP, RSVP-TE, LDP, CR-LDP, and the like.

A number of supplied parameters may be used by the tunnel signalling components 116, 118 to create, configure and/or maintain the one or more tunnels 170 between the PE router 102 and the PE router 104. These parameters may include, for example: the type of tunnelling mechanism to be used (i.e., specifying RSVP-TE or CR-LDP); the QoS profile for each tunnel 170; the PE tunnel endpoints for a particular VPN membership; the VPN technology to use (e.g., Layer-3 technology v. Layer-2 technology, 2547bis v. Virtual Routing, etc.); and the like. For ease of discussion, this information is collectively referred to herein as VPN Capability Discovery Information (VCDI).

In conventional PPVPN systems, this information typically is configured manually at each PE router for each VPN membership. In one embodiment, however, the AD component 112 may be adapted to advertise this information to other PE routers on the backbone 106 using an auto-discovery mechanism (described in greater detail below). The AD component 112 then may provide received VCDI information to the tunnel signalling component 116 for use in creating, maintaining, and/or configuring the one or more tunnels 170 associated with the VCDI information.

The auto-discovery mechanism may be implemented in any of a variety of ways. In at least one embodiment, the auto-discovery mechanism may be implemented as an extension to conventional information distribution protocols, such as BGP, DNS, and RADIUS. To illustrate using BGP, the VCDI information for each of $VPN_A$, $VPN_B$, and $VPN_C$, may be determined and transmitted to the PE routers 102, 104 as profiles 162-166, respectively, as part of a BGP UPDATE 160 transmitted over the backbone 106. Upon receipt of the BGP UPDATE 160, the AD components 112, 114 (each BGP-enabled in this case) then may extract the profiles 162-166 and supply the VCDI information of the profiles 162-166 to the tunnel signalling components 116, 118 for use in creating, maintaining, and/or configuring the VPN tunnel(s) 170 associated with each VPN. DNS, RADIUS, and other directory service protocols may be extended in a similar manner to distribute VCDI to the PE routers. Accordingly, rather than having to manually configure VPN tunnels at each PE router, the VPN tunnel configuration information (i.e., the VCDI) may be "piggy-backed" onto auto-discovery information by extending the auto-discovery protocol to include the transmission of the VCDI information.

Figure 2:
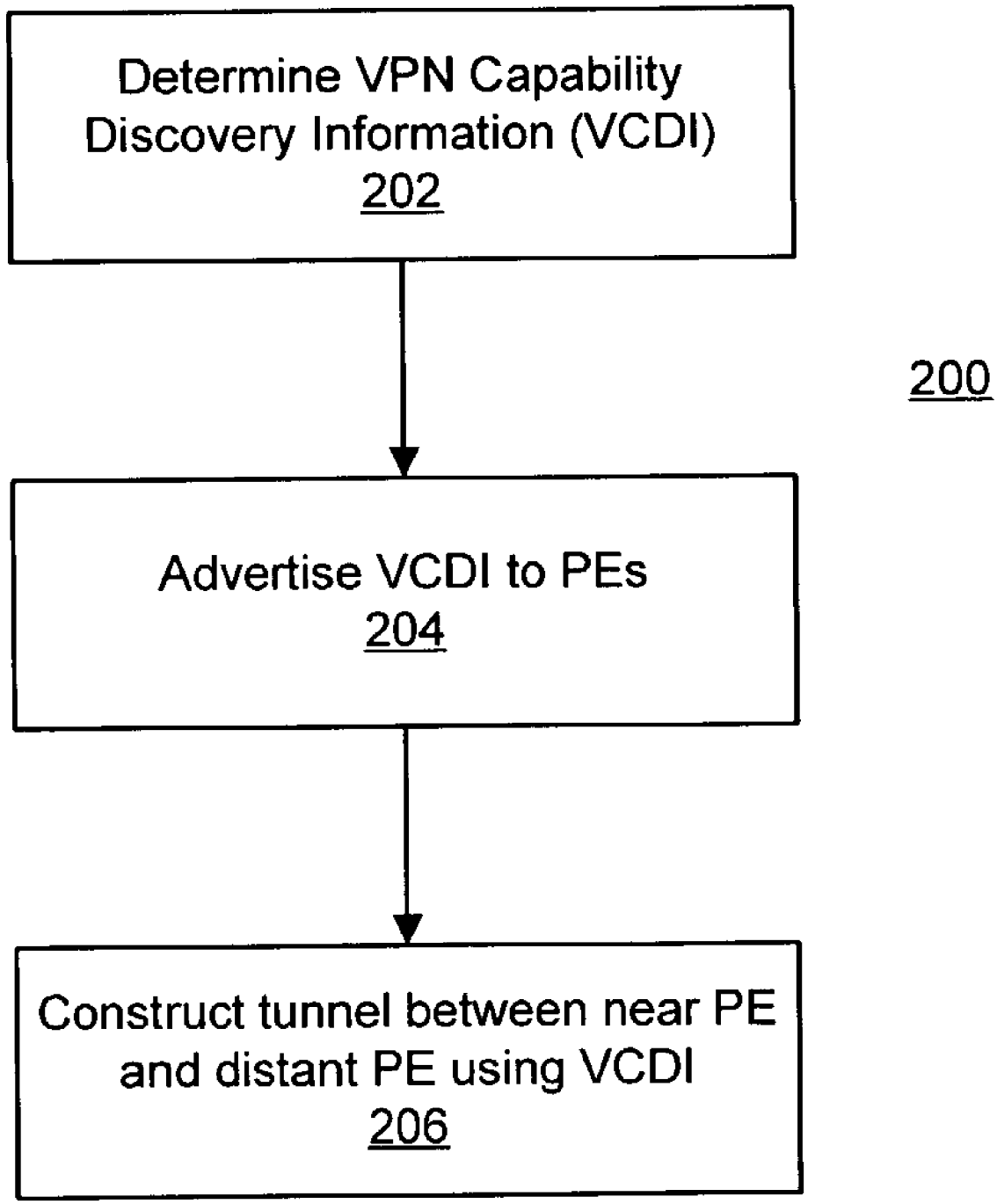
FIG. 2 is a flow diagram illustrating an overview of a VPN auto-discovery mechanism for establishing and/or maintaining a provider-edge-to-provider-edge (PE-PE) tunnel in accordance with at least one embodiment of the present invention.

Referring now to FIG. 2, an exemplary overview of the VPN tunnel configuration process is illustrated in accordance with at least one embodiment of the present invention. In the illustrated example, the VPN tunnel configuration process 200 initiates at step 202, wherein the VCDI information for a given VPN may be determined. The VCDI information may include information regarding the configuration of one or more VPN tunnels between PE routers for the VPN. For example, the VCDI information may specify the PE tunnel endpoints, community route targets, resource parameters (e.g., minimum bandwidth, maximum delay, committed burst size, committed rate, jitter, error, ownership, physical position, type of transport medium, etc.), topology information, and other parameters utilized by the tunnel signalling mechanisms to establish and/or configure a VPN tunnel.

At step 204, the VCDI information obtained at step 202 may be advertised to some or all of the PE routers on the backbone. The advertisement of the VCDI information, in one embodiment, includes incorporating the VCDI information into a conventional information distribution protocol. For example, the VCDI information could be incorporated as an extension of BGP and transmitted between PE routers using, for example, a BGP UPDATE transmission. Alternatively, the VCDI information could be formatted and transmitted in accordance with DNS or RADIUS. Multicast-based protocols also may be extended to multicast the VCDI information to some or all of the PE routers over the backbone.

At step 206, upon receipt of the VCDI information, a PE router may begin negotiating the creation of a VPN (or per VPN) PE-PE tunnel based at least in part on the received VCDI information. As noted above, the creation and configuration of a VPN tunnel is well known in the art (see Hamid Ould-Brahim et al., "Using BGP as an Auto-Discovery Mechanism for Network-Based VPNs," August 2002, available at <http://www.ietf.org/internet-drafts/draft-ietf-ppvpn-bgvpn-auto-03.txt>, the entirety of which is hereby incorporated herein by reference). In creating and configuring the VPN tunnel from the VCDI information, any of a variety of tunnelling mechanisms may be used, as appropriate. Examples of such mechanisms include, for example, RSVP-TE, LDP, CR-LDP, and the like. After creating the VPN tunnel, CE devices on the various VPN segments them may utilize the VPN tunnel to transmit data securely between VPN segments.

Figure 3:
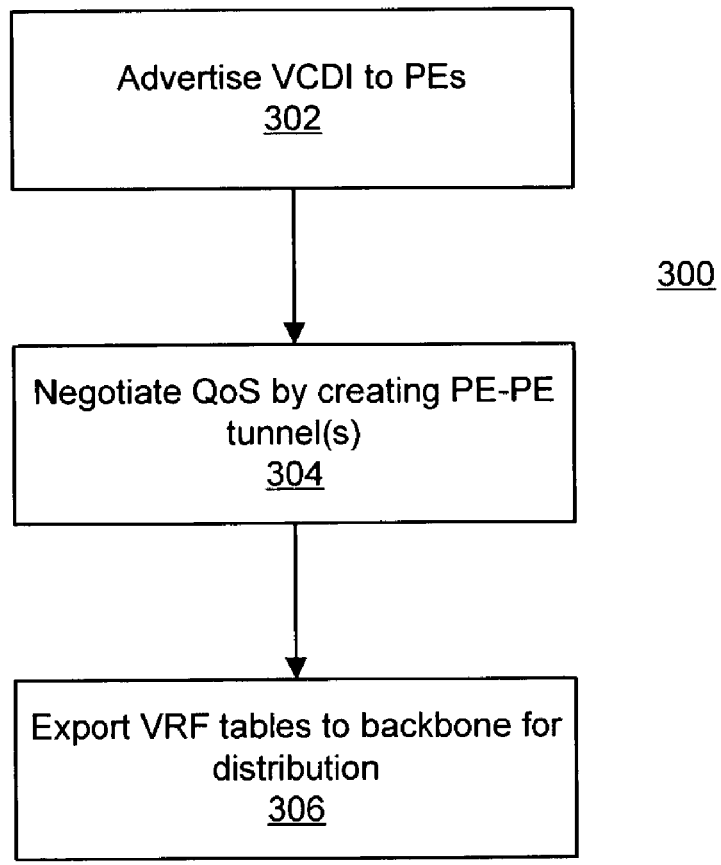
FIG. 3 is a flow diagram illustrating an exemplary implementation of the VPN auto-discovery mechanism of FIG. 2 in a RFC 2547bis-based VPN in accordance with at least one embodiment of the present invention.
Figure 4:
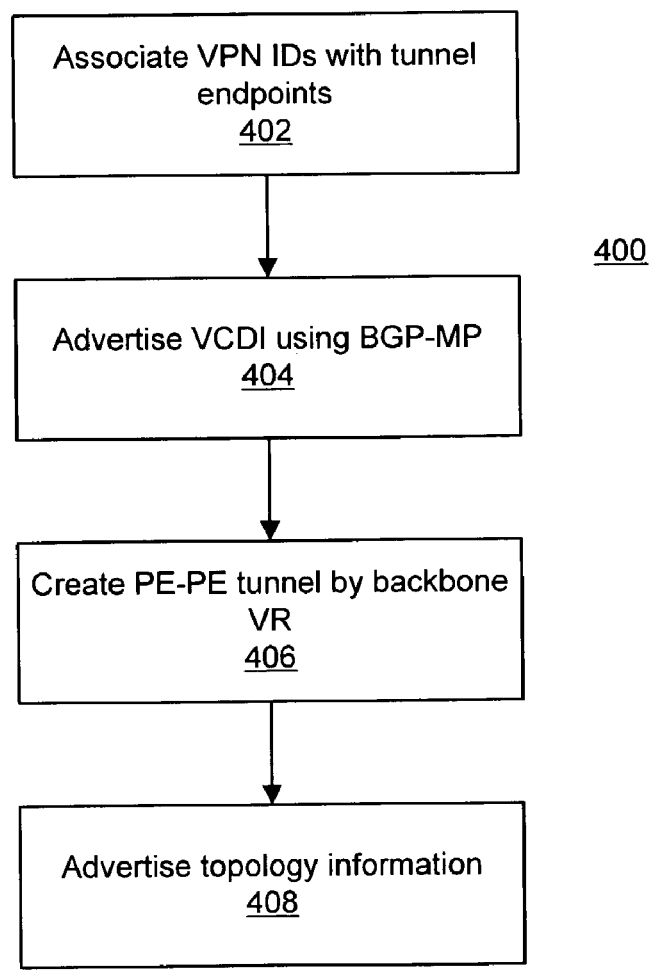
FIG. 4 is a flow diagram illustrating an exemplary implementation of the VPN auto-discovery mechanism of FIG. 2 in a Virtual Routing-based VPN in accordance with at least one embodiment of the present invention.
Figure 5:
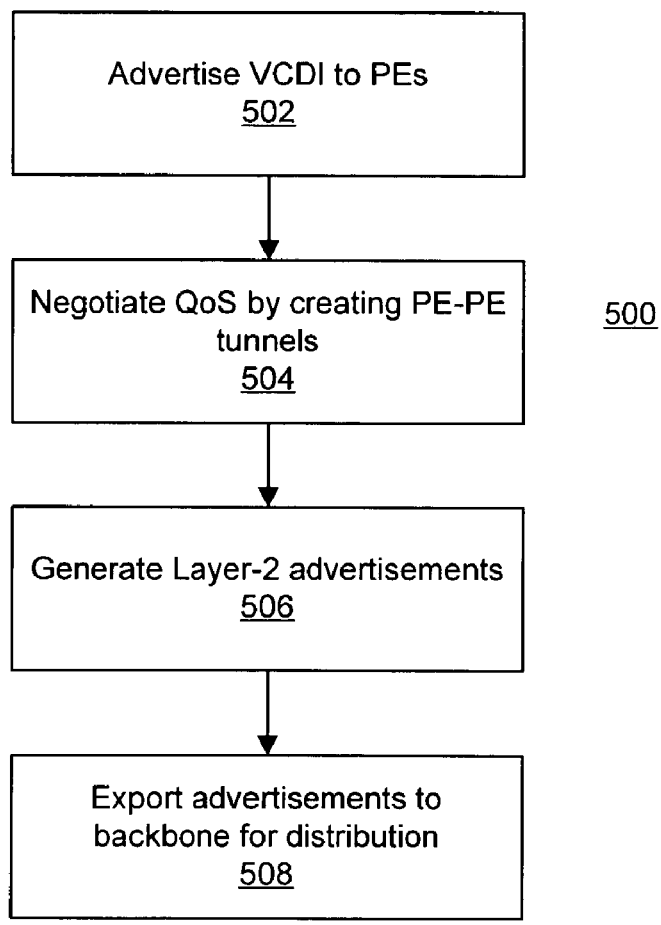
FIG. 5 is a flow diagram illustrating an exemplary implementation of the VPN auto-discovery mechanism of FIG. 2 in a Layer-2 VPN using a Virtual Private Local Area Network Service (VPLS)-based or VPW-based mechanism in accordance with at least one embodiment of the present invention.

Referring now to FIGS. 3-5, various exemplary implementations of the process 200 of FIG. 2 for certain VPN technologies are illustrated in accordance with at least one embodiment of the present invention. FIG. 3 illustrates an exemplary implementation of the process 200 for a VPN system implementing a Layer-3 VPN using RFC 2547bis. FIG. 4 illustrates an exemplary implementation of the process 200 for a VPN system implementing a Layer-3 VPN using Virtual Routing. FIG. 5 illustrates an exemplary implementation of the process 200 for a VPN system implementing a Layer-2 VPN using VPLS or VPW. While exemplary implementations of the process 200 are illustrated for a number of VPN technologies, those skilled in the art, using the guidelines provided herein, may modify the process 200 for various other VPN technologies without departing from the spirit or the scope of the present invention.

Referring now to FIG. 3, an exemplary auto-discovery process 300 for distributing VPN tunnel configuration information in a Layer-3 PPVPN based on RFC 2547bis is illustrated in accordance with at least one embodiment of the present invention. After determining the relevant VCDI information (step 202, FIG. 2), the process 300 initiates at step 302, wherein the VCDI information associated with one or more VPN tunnels may be advertised to the AD components of the PE routers (e.g., AD components 112, 114, FIG. 1), as discussed above. As noted above, the VCDI information preferably is distributed as an extension of an auto-discovery protocol, such as BGP, DNS, or RADIUS. At step 304, the tunnel signalling component (e.g., tunnel signalling components 116, 118, FIG. 1) at a PE router negotiates with the tunnelling mechanism at a corresponding PE router to establish and configure one or more VPN tunnels based at least in part on the supplied VCDI information. This configuration may include, for example, negotiating QoS for the VPN tunnel, setting a minimum or maximum bandwidth for the VPN tunnel, specifying the tunnelling mechanism, and the like. Alternatively, in one embodiment, the tunnel signalling component may select a pre-existing VPN tunnel that complies with some or all of the parameters set forth by in the VCDI information.

Upon creation and configuration of the VPN tunnel (or selection of a pre-existing tunnel), Virtual Routing Forwarding (VRF) tables may be generated at each PE router. The generation of VRF tables is well known in the art. At step 306, these VRF tables then may be exported to the backbone using, for example, BGP and then distributed to the appropriate PE routers for use in routing VPN traffic through the established tunnel.

Referring now to FIG. 4, an exemplary auto-discovery process 400 for distributing VPN tunnel configuration information in a Layer-3 VPN based on Virtual Routing is illustrated in accordance with at least one embodiment of the present invention. After determining the relevant VCDI information (step 202, FIG. 2), the process 400 initiates at step 402, wherein VPN IDs are associated with the endpoints of the tunnel to be established/selected. At this point, it typically is not necessary to advertise the VR prefixes/addresses. At step 404, a list of the VPN IDs is included with other VCDI information and this information may be advertised to the AD components of the PE routers (e.g., AD components 112, 114, FIG. 1), as discussed above. For Virtual Routing implementations, the VCDI information preferably is distributed as an extension of a BGP Multiprotocol Extension (BGP-MP). Other information distribution protocols, such as DNS, RADIUS, and IP multicasting may be utilized. At this point, it may be appropriate to advertise the VR prefixes/addresses.

At step 406, the backbone Virtual Router receiving the VCDI information may be adapted to establish and configure one or more VPN tunnels based at least in part on the supplied VCDI information. This configuration may include, for example, negotiating QoS for the VPN tunnel, setting a minimum or maximum bandwidth for the VPN tunnel, specifying the tunnelling mechanism, and the like. Alternatively, in one embodiment, the tunnel signalling component may select a pre-existing VPN tunnel that complies with some or all of the parameters set forth by in the VCDI information. At step 408, the VPN topology information may be advertised in a manner similar to the advertisement of the VCDI information at step 404.

Referring now to FIG. 5, an exemplary auto-discovery process 500 for distributing VPN tunnel configuration information in a Layer-2 PPVPN based on VPLS or VPW is illustrated in accordance with at least one embodiment of the present invention. After determining the relevant VCDI information (step 202, FIG. 2), the process 500 initiates at step 502, wherein the VCDI information associated with one or more VPN tunnels is advertised to the AD components of the PE routers (e.g., AD components 112, 114, FIG. 1), as discussed above. At this point, it may be unnecessary to exchange Layer-2 VPN services. As noted above, the VCDI information preferably is distributed as an extension of an auto-discovery protocol, such as BGP, DNS, or RADIUS.

At step 504, the tunnel signalling component (e.g., tunnel signalling components 116, 118, FIG. 1) at a PE router negotiates with the tunnelling mechanism at a corresponding router to establish and configure one or more VPN tunnels based at least in part on the supplied VCDI information. This configuration may include, for example, negotiating QoS for the VPN tunnel, setting a minimum or maximum bandwidth for the VPN tunnel, specifying the tunnelling mechanism, and the like. Alternatively, in one embodiment, the tunnel signalling component may select a pre-existing VPN tunnel that complies with some or all of the parameters set forth by in the VCDI information.

Upon creation and configuration of the VPN tunnel (or selection of a pre-existing tunnel), Layer-2 VPN advertisements may be created at step 506 and distributed using the backbone BGP component (e.g., AD components 112, 114) at step 508.

At this point, it should be noted that implementing an auto-discovery VPN tunnel configuration process in accordance with the present invention as described above typically involves the processing of input data and the generation of output data to some extent. This input data processing and output data generation may be implemented in hardware or software. For example, specific electronic components may be employed in a node or similar or related circuitry for implementing an auto-discovery component and tunnel signalling component in accordance with the present invention as described above. Alternatively, one or more processors operating in accordance with stored instructions may implement the functions associated with implementing an auto-discovery VPN tunnel configuration process in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for establishing a Virtual Private Network (VPN) tunnel between a first provider edge (PE) device and a second provider edge (PE) device of a Provider-Provisioned VPN (PPVPN) comprising:
    advertising at least one tunnel-based parameter to one or more PE devices over a network backbone using an extension to an auto-discovery protocol, the one or more PE devices including at least one of the first and second PE devices;
    determining VPN capability discovery information including the at least one tunnel-based parameter; and
    negotiating between the first and second PE devices to automatically establish and configure a VPN tunnel between the first and second PE devices based upon the VPN capability discovery information.

2. The method as in claim 1, wherein the auto-discovery protocol includes one of a group consisting of: a Border Gateway Protocol (BGP)-based mechanism; a Domain Name Service (DNS)-based mechanism; and a Remote Authentication Dial In User Service (RADIUS)-based mechanism.

3. The method as in claim 1, wherein automatically configuring the VPN tunnel includes automatically configuring the VPN tunnel using at least one tunnel signalling mechanism.

4. The method as in claim 3, wherein the at least one tunnel signalling mechanism includes one of a group consisting of: a Resource Reservation Protocol (RSVP)-based mechanism; a Resource Reservation Protocol-Traffic Engineered (RSVP-TE)-based mechanism; a Label Distribution Protocol (LDP)-based mechanism; and a Constraint-based Routing LDP (CR-LDP) based mechanism.

5. The method as in claim 1, wherein the at least one tunnel-based parameter includes one of a group consisting of: a type of tunnelling mechanism; at least one PE tunnel endpoint; at least one community route target; topology information; and at least one resource parameter.

6. The method as in claim 5, wherein the at least one resource parameter includes one of a group consisting of: minimum bandwidth; maximum delay; committed burst size; committed rate; jitter; error; ownership; physical position and transport medium.

7. At least one processor readable carrier for storing a computer program of instructions configured to be readable by at least one processor for instructing the at least one processor to execute a computer process for performing the method as recited in claim 1.

8. The method of claim 1, wherein automatically configuring the VPN tunnel includes selecting a pre-existing VPN tunnel, the pre-existing VPN tunnel being compliant with the at least one tunnel-based parameter.

9. In a Provider-Provisioned Virtual Private Network (PPVPN), a system comprising:
    auto-discovery means for distributing at least one Virtual Private Network (VPN) tunnel-based parameter to at least a first provider edge (PE) device and a second provider edge (PE) device using an extension to an auto-discovery protocol; and
    tunnel signalling means for determining VPN capability discovery information including the at least one tunnel-based parameter, and negotiating between the first and second PE devices to automatically establish and configure a VPN tunnel between the first and second PE devices based upon the VPN capability discovery information.

10. The system as in claim 1, wherein the auto-discovery protocol comprises one of a group consisting of: a Border Gateway Protocol (BGP)-based mechanism; a Domain Name Service (DNS)-based mechanism; and a Remote Authentication Dial In User Service (RADIUS)-based mechanism.

11. The system as in claim 10, wherein the tunnel signalling means includes one of a group consisting of: a Resource Reservation Protocol (RSVP)-based mechanism; a Resource Reservation Protocol-Traffic Engineered (RSVP-TE)-based mechanism; a Label Distribution Protocol (LDP)-based mechanism; and a Constraint-based Routing LDP (CR-LDP) based mechanism.

12. The system as in claim 10, wherein the at least one tunnel-based parameter includes one of a group consisting of: a type of tunnelling mechanism; at least one PE tunnel endpoint; at least one community route target; topology information; and at least one resource parameter.

13. The system as in claim 12, wherein the at least one resource parameter includes one of a group consisting of: minimum bandwidth; maximum delay; committed burst size; committed rate; jitter; error; ownership; physical position and transport medium.

14. In a distributed network, a Provider-Provisioned Virtual Private Network (PPVPN) system comprising:
    a network backbone;
    a first provider edge (PE) device and a second provider edge (PE) device, each operably connected to the network backbone;
    an auto-discovery mechanism for distributing at least one VPN tunnel-based parameter to at least the first and second PE devices using an extension to an auto-discovery protocol; and
    a tunnel signalling mechanism adapted to determine VPN capability discovery information including the at least one tunnel-based parameter, and negotiate between the first and second PE devices to automatically establish and configure a VPN tunnel between the first and second PE devices based upon the VPN capability discovery information.

15. The system as in claim 14, wherein the auto-discovery protocol comprises one of a group consisting of: a Border Gateway Protocol (BGP)-based mechanism; a Domain Name Service (DNS)-based mechanism; and a Remote Authentication Dial In User Service (RADIUS)-based mechanism.

16. The system as in claim 14, wherein the tunnel signalling mechanism includes one of a group consisting of: a Resource Reservation Protocol (RSVP)-based mechanism; a Resource Reservation Protocol-Traffic Engineered (RSVP-TE)-based mechanism; a Label Distribution Protocol (LDP)-based mechanism; and a Constraint-based Routing LDP (CR-LDP) based mechanism.

17. The system as in claim 14, wherein the at least one tunnel-based parameter includes one of a group consisting of: a type of tunnelling mechanism; at least one PE tunnel endpoint; at least one community route target; topology information; and at least one resource parameter.

18. The system as in claim 17, wherein the at least one resource parameter includes one of a group consisting of: minimum bandwidth; maximum delay; committed burst size; committed rate; jitter; error; ownership; physical position and transport medium.

* * * * *